J. J. LYONS.
BRAKE MECHANISM.
APPLICATION FILED AUG. 17, 1911.
1,017,223.
Patented Feb. 13, 1912.
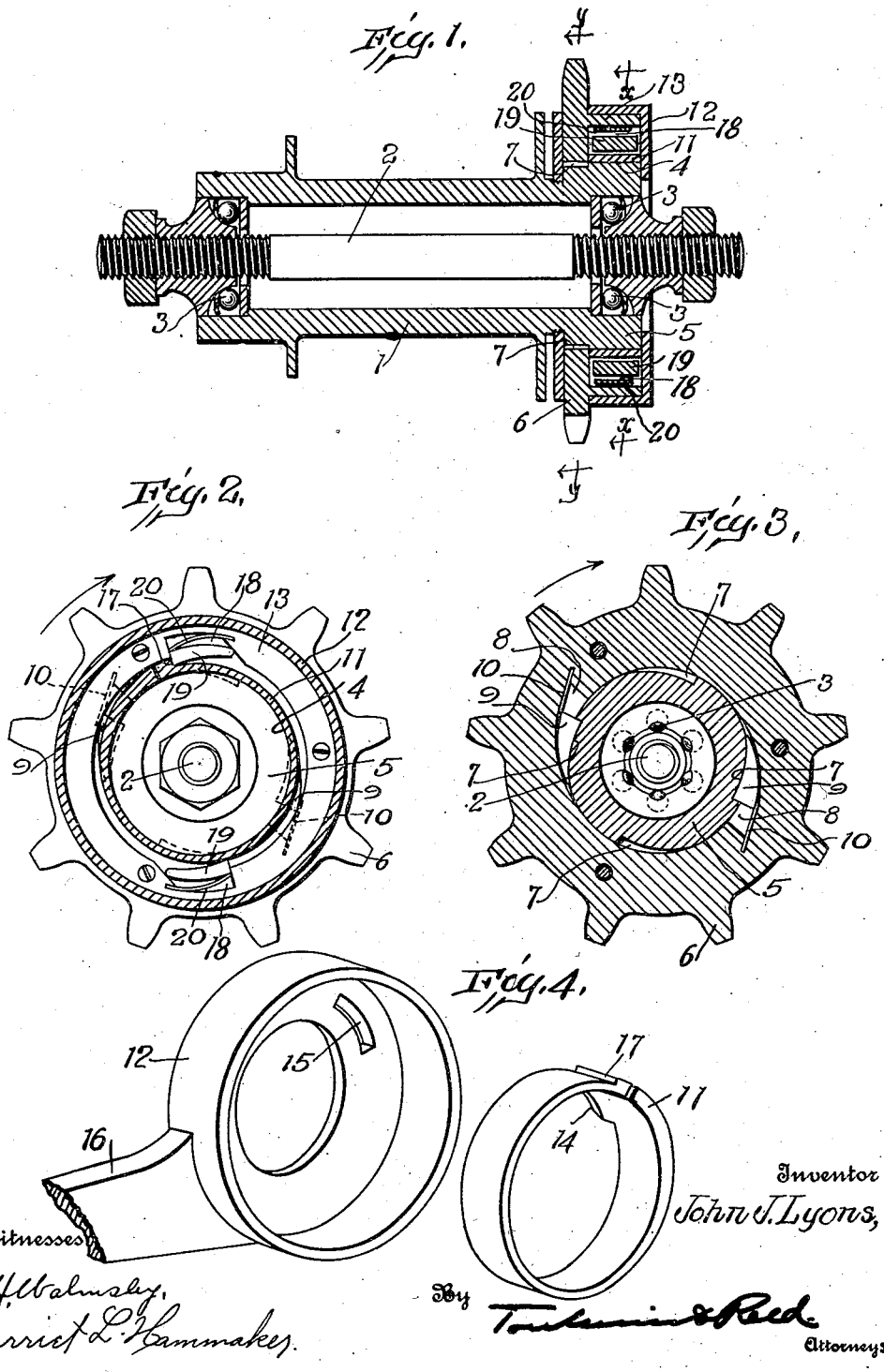

UNITED STATES PATENT OFFICE.

JOHN J. LYONS, OF DAYTON, OHIO, ASSIGNOR OF ONE-FOURTH TO GEORGE W. OZIAS AND ONE-FOURTH TO CHARLES WHEALEN, BOTH OF DAYTON, OHIO.

BRAKE MECHANISM.

1,017,223.  Specification of Letters Patent.  Patented Feb. 13, 1912.

Application filed August 17, 1911. Serial No. 644,625.

*To all whom it may concern:*

Be it known that I, JOHN J. LYONS, a citizen of the United States, residing at Dayton, in the county of Montgomery and State of Ohio, have invented certain new and useful Improvements in Brake Mechanism, of which the following is a specification, reference being had therein to the accompanying drawing.

This invention relates to brake mechanism and more particularly to what are known as sprocket brakes.

The object of the invention is to provide a sprocket brake which will be very simple in its construction and will possess a high degree of efficiency; and which will be of such a construction that it will be readily accessible.

To this end it is a further object of the invention to apply the brake devices to the exterior of one end of the hub, these devices being connected with the sprocket wheel or driving member in such a manner as to be controlled thereby.

In the accompanying drawings, Figure 1 is a sectional view taken longitudinally to the hub of a bicycle wheel equipped with my invention; Fig. 2 is a transverse, sectional view, taken on the line $x$ $x$ of Fig. 1 and looking in the direction of the arrows; Fig. 3 is a longitudinal, sectional view taken on the line $y$ $y$ of Fig. 1 and looking in the direction of the arrows; and Fig. 4 is a detail view of the cap and the brake-band carried thereby.

In these drawings I have illustrated one embodiment of my invention and have shown the same as applied to the hub 1 of a bicycle wheel of ordinary construction. This hub is hollow and has mounted therein an axle 2, the outer ends of which may be connected to the frame members of the bicycle in the usual manner, ball bearings 3 being interposed between the hub and the axle. The hub 1 projects for a short distance on either side of the spokes of the wheel and one of these end portions has its outer surface shaped to form a brake member. In the present instance this end portion is integral with the body of the hub and the outer surface thereof is cylindrical and comprises a friction drum, as indicated at 4, and, to give the drum the desired amount of surface, the thickness of the end of the hub is increased to give the friction drum a greater exterior diameter, the thickened end portion of the hub being indicated at 5. A driving member, such as a sprocket wheel 6, is operatively connected with the hub and is here shown as mounted on the end portion of the hub between the friction drum 4 and the spokes on that end of the hub. The sprocket is loosely mounted on the hub and is connected thereto by clutch mechanism which will cause the hub to rotate with the sprocket wheel when the latter is rotated forwardly and which will permit the sprocket wheel to rotate rearwardly independently of the hub. This clutch mechanism may be of any suitable character but, in the present instance, the adjacent portion of the hub is provided with an annular series of tapered recesses 7 having their tapered portions at their rear ends. The bearing surface of the sprocket wheel or driving member is also provided with one or more tapered recesses 8 within which are mounted tapered dogs 9 which are held in engagement with the hub by means of springs 10. The forward movement of the sprocket wheel is in the direction of the arrows shown in Figs. 2 and 3 and it will be apparent that as the sprocket wheel moves forward each dog will enter one of the recesses 7 in the hub and will engage the forward end of said recess. The tapered portion of the dog being held against rearward movement by contact with the converging surfaces of the recesses in the hub and the sprocket wheel, respectively, the hub will be caused to rotate with the sprocket wheel, thereby providing a positive driving connection of great strength. If the sprocket wheel ceases to rotate in a forward direction the hub is free to continue its forward rotation, the dog or dogs 9 entering the respective recesses in the sprocket wheel and riding over the exterior surface of the hub without interfering with its rotation.

A suitable brake member is provided to coöperate with the friction drum. This brake member preferably comprises a brake band 11 which is held against rotation with the friction drum. In the present instance the brake band is carried by a cap 12 which extends about an annular outwardly extending flange 13 carried by the sprocket wheel 6 and not only forms a support for the brake band but also incloses the entire brake mechanism. In the present construction this brake band is secured to the cap by providing the same with a lug 14 arranged near one end thereof and extending into a recess 15 in the cap 12. In this manner the entire strain on the brake band is imposed upon the wall of the cap. This cap is held against rotation preferably by means of an arm 16 rigidly secured thereto and connected with one of the frame members of the bicycle. Suitable means are provided whereby the rearward movement of the sprocket wheel, that is, its rotation in a direction opposite to that indicated by the arrow in Fig. 3, will tighten the brake band about the friction drum and cause the same to resist the forward movement of the sprocket wheel. To accomplish this result I have, in the present device, provided the brake band near its free end with a shoulder 17 and have provided the annular flange 13 carried by the sprocket wheel with a part or parts adapted to engage the shoulder 17 of the brake band when the sprocket wheel is rotated in a rearward direction. As here shown the flange 13 has two recesses or pockets 18, although any number may be employed, and in each pocket is loosely mounted a tapered dog 19 which is held in engagement with the brake band by a spring 20. When the sprocket wheel is rotated in the direction of the arrow, that is, in a direction to cause the dogs 9 to drive the hub in a forward direction, the dogs 19 will ride over the friction band and the latter will not offer any resistance to the rotation of the friction drum. Likewise, when the sprocket wheel is held against movement in either direction the brake band will offer no resistance to the rotation of the drum, but, when the sprocket wheel is rotated in a rearward direction, one of the dogs 19 will engage the shoulder 17 on the free end of the brake band and tighten the brake band about the friction drum, the amount of friction created by the engagement of these parts being controlled by the power applied to the sprocket wheel. As soon as the rearward pressure on the sprocket wheel is removed the resilience of the brake band will cause the same to immediately release the friction drum and the hub is again free to rotate in a forward direction.

In this device I have provided a brake mechanism controlled by the driving member which is very simple in its construction, comprises a minimum number of parts and is positive in its action and therefore, has a very high degree of efficiency. Further, the device is mounted on the exterior of the hub where access can be readily had thereto.

It will be understood that while I have shown and described the invention as applied to a bicycle wheel it is by no means limited to wheels of this character but may be interposed between rotating members of various kinds and their driving members and I, therefore, wish it to be understood that the construction shown and described is chosen for the purpose of illustration only and I do not desire to be limited to the details of construction shown and described, for obvious modifications will occur to a person skilled in the art.

Having thus fully described my invention, what I claim as new and desire to secure by Letters Patent, is:—

1. The combination, with a hub having a part constituting a friction, a driving member loosely mounted on said hub adjacent to said friction drum, and a clutch connection between said hub and said driving member, of a part carried by said driving member and having a recess therein, a brake band arranged between said friction drum and said part and having one end secured to a fixed support and the other end free, and a movable dog mounted in the recess to engage said brake band to force the same into operative engagement with said friction drum when said driving member is moved in one direction.

2. The combination, with a hub having a friction drum, a driving member loosely mounted in said hub adjacent to said friction drum, and a clutch connection between said hub and said driving member, of a part carried by said driving member, another part constituting a brake member arranged between said friction drum and said first mentioned part, and having one end secured to a fixed support and the other end free, a movable dog mounted in a recess in one of said parts and adapted to hold them in engagement and force said second mentioned part into operative engagement with said friction drum when said driving member is moved in one direction.

3. The combination, with a hub having a friction drum, a driving member loosely mounted on said hub adjacent to said friction drum, and a clutch connection between said hub and said driving member, of a part secured to said driving member and having a recess therein, a brake member extending about said friction drum and having one end secured to a fixed support and the other end free, said free end of said brake member having a shoulder, a spring actuated dog mounted in said recess and adapted to engage said shoulder and force said brake member into operative engagement with said friction drum when said driving member is moved in one direction.

4. The combination, with a hub having a portion constituting a friction drum, a driving member for said hub, and a clutch connection between said hub and said driving member, of a brake band extending about said drum and having a shoulder, means for preventing the rotation of said brake band, and a dog connected with said driving member and adapted to engage said shoulder when said driving member is moved in one direction.

5. The combination, with a hub having a part constituting a friction drum, a driving member loosely mounted on said hub adjacent to said friction drum, and a clutch connection between said hub and said driving member, of a part carried by said driving member and extending across and out of engagement with said friction drum, a friction band extending about said friction drum, an actuating member arranged between the part carried by said driving member and said brake band and adapted to move said brake band into operative engagement with said friction drum when said driving member is moved in one direction, and means to prevent the rotation of said brake band.

6. The combination, with a hub having a part constituting a friction drum, a driving member loosely mounted on said hub adjacent to said friction drum, and a clutch connection between said hub and said driving member, of an annular flange secured to said driving member and extending about said friction drum, a brake band extending about said friction drum and having a shoulder, means for preventing the rotation of said brake band, and an actuating member interposed between said flange and said brake band to engage said shoulder when said driving member is moved in one direction.

7. The combination, with a hub having a part constituting a friction drum, a driving member loosely mounted on said hub adjacent to said friction drum, and a clutch connection between said hub and said driving member, of a flange carried by said driving member and extending across the surface of said friction drum, a cap mounted on said flange, inclosing the space between the same and said friction drum, a brake band carried by said cap and extending between said friction drum and said flange, means for preventing the rotation of said cap, and a part interposed between said flange and said brake band to move said brake band into operative engagement with said friction drum when said driving member is moved in one direction.

In testimony whereof, I affix my signature in presence of two witnesses.

JOHN J. LYONS.

Witnesses:
W. S. RHOTEHAMEL,
EDWARD S. REED.